(12) United States Patent
Kohli

(10) Patent No.: US 10,204,215 B2
(45) Date of Patent: Feb. 12, 2019

(54) SYSTEM AND METHOD FOR PROCESSING A TRANSACTION WITH SECURED AUTHENTICATION

(71) Applicant: MasterCard International Incorporated, Purchase, NY (US)

(72) Inventor: Manoneet Kohli, O'Fallon, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 217 days.

(21) Appl. No.: 15/162,847

(22) Filed: May 24, 2016

(65) Prior Publication Data

US 2017/0344732 A1 Nov. 30, 2017

(51) Int. Cl.

| G06Q 20/36 | (2012.01) |
|---|---|
| G06F 21/32 | (2013.01) |
| G06F 21/34 | (2013.01) |
| G06Q 20/34 | (2012.01) |
| G06Q 20/40 | (2012.01) |
| H04L 29/06 | (2006.01) |

(52) U.S. Cl.
CPC ............. *G06F 21/32* (2013.01); *G06F 21/34* (2013.01); *G06Q 20/352* (2013.01); *G06Q 20/35785* (2013.01); *G06Q 20/36* (2013.01); *G06Q 20/409* (2013.01); *G06Q 20/40145* (2013.01); *H04L 63/0853* (2013.01); *H04L 63/0861* (2013.01)

(58) Field of Classification Search
USPC ............ 726/7, 2, 21, 36; 713/150, 163, 181; 380/255, 264, 276
See application file for complete search history.

(56) References Cited

U.S. PATENT DOCUMENTS 5,267,314 A * 11/1993 Stambler ............... G06Q 20/02
                                                         705/75
5,555,303 A    9/1996 Stambler
(Continued)

FOREIGN PATENT DOCUMENTS

CA           2906914           3/2016

OTHER PUBLICATIONS

Eich, Martine, "International Search Report", International Application No. PCT/US2017/028221, dated Jun. 13, 2017, 5 pages.
(Continued)

*Primary Examiner* — Sharif E Ullah

(57) ABSTRACT

Embodiments of the disclosure enable one or more transactions to be processed with secured authentication. A system server receives a request for authentication for an article associated with a first user that is associated with a user account, identifies one or more client devices associated with one or more secondary users that are associated with the user account, communicates with the one or more client devices to obtain biometric data associated with the one or more secondary users, determines whether to approve the request for authentication based on the biometric data associated with the one or more secondary users, and, on condition that the request for authentication is approved, generates an authentication token. Aspects of the disclosure leverage authentication technology to authenticate one or more identities of one or more users to allow the users to confirm that an article is associated with another user.

20 Claims, 7 Drawing Sheets

(56) References Cited

U.S. PATENT DOCUMENTS

| | | | |
|---|---|---|---|
| 5,646,998 A | 7/1997 | Stambler | |
| 5,903,721 A * | 5/1999 | Sixtus | G06Q 20/02 726/2 |
| 7,587,366 B2 * | 9/2009 | Grim, III | G06Q 20/40 705/44 |
| 2002/0018585 A1 * | 2/2002 | Kim | G06K 9/00067 382/125 |
| 2007/0288392 A1 * | 12/2007 | Peng | G06Q 20/04 705/72 |
| 2008/0178262 A1 * | 7/2008 | Taniguchi | G06F 21/32 726/2 |
| 2010/0246902 A1 * | 9/2010 | Rowe | G06K 9/00033 382/115 |
| 2011/0145899 A1 * | 6/2011 | Cao | H04L 9/3213 726/7 |
| 2013/0036058 A1 * | 2/2013 | Kelly | G06Q 20/322 705/67 |
| 2013/0138964 A1 * | 5/2013 | Joyce, III | H04L 9/3231 713/176 |
| 2015/0010047 A1 * | 1/2015 | Zhong | H04L 25/03057 375/233 |

OTHER PUBLICATIONS

Eich, Martine, "Written Opinion", International Application No. PCT/US2017/028221, dated Jun. 13, 2017, 6 pages.

\* cited by examiner

SYSTEM AND METHOD FOR PROCESSING A TRANSACTION WITH SECURED AUTHENTICATION

FIELD OF THE DISCLOSURE

The subject matter described herein relates generally to information processing and, more specifically, to processing a transaction with secured authentication.

BACKGROUND

For hard or physical copies of a document, a hand-written signature may be used to demonstrate that an author of the signature has approved or agreed to the content of the document. Under some circumstances, the signature may be used to legally bind the author to act (or not act) in accordance with the contents of a document. For this reason, at least some documents require that the signature be witnessed by a person who can confirm that the author signed the document.

The concept of signing a physical copy of a document has been applied to at least some electronic documents. For example, at least some known mechanisms for signing an electronic signature include inputting a particular sequence of keystrokes associated with a user (e.g., a password, a personal identification number (PIN)). However, an integrity of a password or PIN may be compromised if a person other than the user acquires possession of the password or PIN.

SUMMARY

Embodiments of the disclosure enable a computing device to process one or more transactions. The computing device includes a memory device storing data associated with one or more user accounts, and computer-executable instructions, and a processor configured to execute the computer-executable instructions to receive a request for authentication for an article associated with a first user that is associated with a user account, identify one or more client devices associated with one or more secondary users that are associated with the user account, communicate with the one or more client devices to obtain biometric data associated with the one or more secondary users, determine whether to approve the request for authentication based on the biometric data associated with the one or more secondary users, and, on condition that the request for authentication is approved, generate an authentication token for generating an authenticated article.

In another aspect, a computer-implemented method is provided for processing one or more transactions. The computer-implemented method includes receiving, from a first client device, a request for authorization for an article associated with a first user that is associated with a user account, accessing the user account to identify one or more secondary client devices associated with one or more secondary users that are associated with the user account, transmitting, to the one or more secondary client devices, a prompt for user input associated with biometric data for attesting the article is associated with the first user, receiving, from the one or more secondary client devices, biometric data associated with the one or more secondary users, determining whether to approve the request for authentication based on the biometric data associated with the one or more secondary users, and, on condition that the request for authentication is approved, generating a token for generating an authenticated article.

In yet another aspect, a computer-readable storage device having computer-executable instructions embodied thereon is provided. The computer-readable storage device includes an interface component, an authentication component, and a token component. The interface component receives a request for authorization for an article associated with a first user that is associated with a user account. The authentication component identifies one or more secondary users associated with the user account, and obtains biometric data associated with the one or more secondary users. The token component determines whether to approve the request for authentication based on the biometric data associated with the one or more secondary users, and, on condition that the request for authentication is approved, generates an authentication token.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Figure 1:
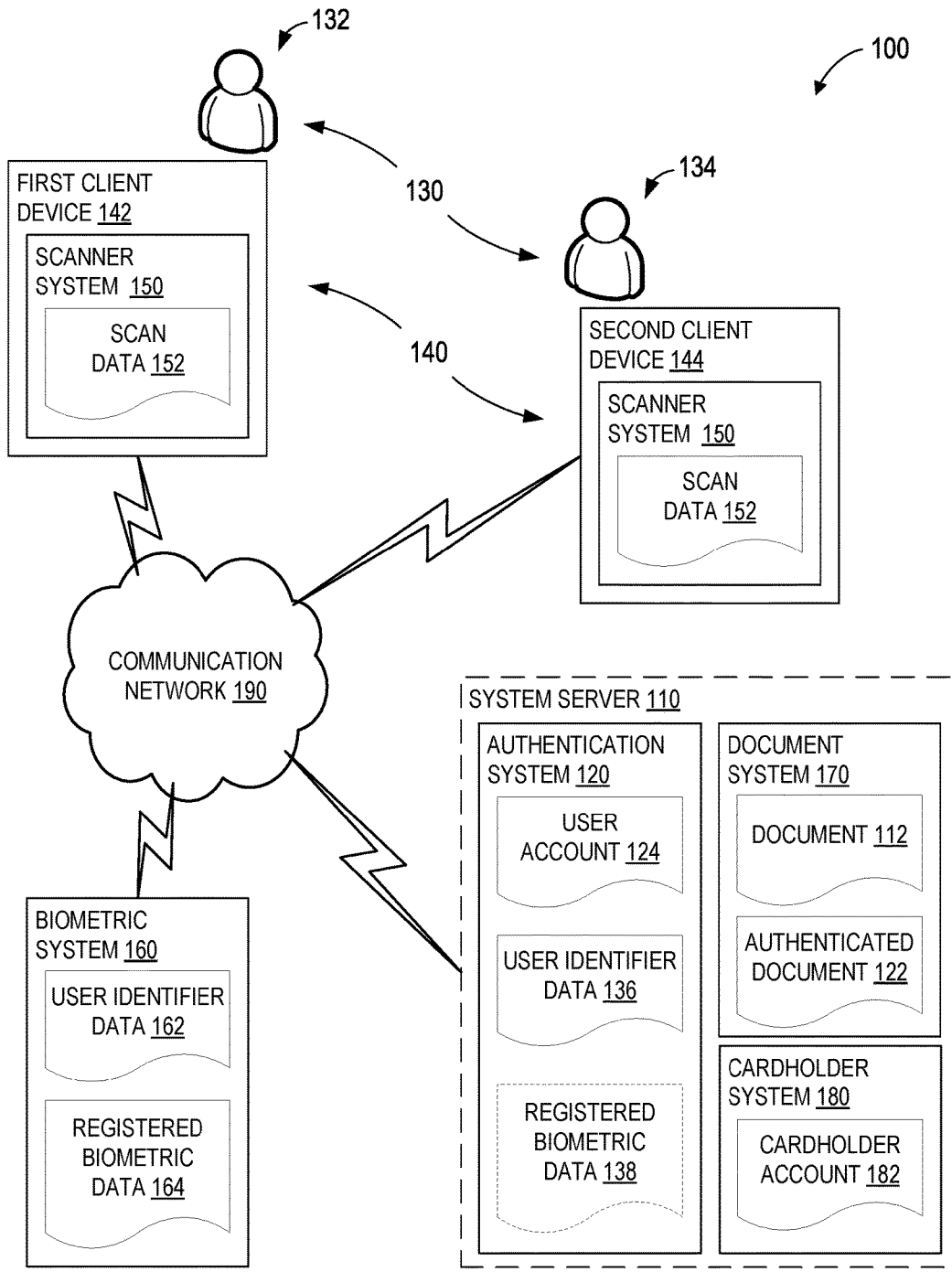
FIG. 1 is a block diagram illustrating an example system for processing one or more transactions.

The subject matter described herein relates to systems and methods for processing one or more transactions. Embodiments of the disclosure provide the ability to confirm one or more identities of one or more users associated with an article (e.g., a document) for generating an authentication token for the article. For example, a request for authentication for a document may be received from a first user and/or a computing device associated with the first user. Biometric data associated with one or more second or secondary users may be obtained to attest, for example, that the document is associated with the first user (e.g., the document is physically or electronically signed by the first user). Upon approving the request for authentication, an authentication token is generated and coupled to the document to generate an authenticated article (e.g., authenticated document). The authenticated document may be used, for example, in a transaction that conventionally involves one or more witnesses or a public notary, such as a government-to-consumer (G2C) transaction.

Aspects of the disclosure provide for a computing device that processes one or more transactions in an environment including a plurality of devices coupled to each other via a network (e.g., a local area network (LAN), a wide area network (WAN), the Internet). For example, a system server may be used to communicate with one or more other computing systems (e.g., a client device, a scanner system, a document system, a cardholder system, a biometric system) to receive or retrieve an authentication request and/or transmit an authentication token to facilitate processing a transaction. In this manner, a document may be automatically authenticated with at least some confidence that the document is associated with a particular user.

The systems and processes described herein may be implemented using computer programming or engineering techniques including computer software, firmware, hardware or a combination or subset thereof. At least one technical problem with known systems is that, with the volume of electronic communications being transmitted and with the volume of transactions being conducted, generally, it can be difficult, time-consuming, and/or resource-intensive to determine whether a transaction is legitimate or illegitimate. This technical problem may take on another element or dimension for transactions that conventionally involve another person (e.g., witness, public notary) corroborating at least some aspects of the transaction. The embodiments described herein addresses at least these technical problems. By processing transactions in the manner described in this disclosure, some embodiments improve user experience, user efficiency, and/or user interaction performance by using biometric data to confirm one or more identities of one or more users for generating one or more authenticated documents. In this manner, the embodiments described herein may facilitate achieving a balance between convenience to the user and security from fraud. Additionally, some embodiments may reduce processor load by reducing an amount of data to be analyzed or processed, reduce network bandwidth usage and/or improve communication between systems by reducing an amount of data to be transmitted, improve processor security and/or data transmission security by using biometric data to process transactions, and/or reduce error rate by automating the analysis and processing of transactions. In some embodiments, the subject matter described herein may facilitate increasing processor speed and/or improving operating system resource allocation.

The technical effect of the systems and processes described herein is achieved by performing at least one of the following operations: a) receiving a request for registration including biometric data associated with a first user; b) registering the biometric data associated with the first user with a user account; c) receiving a request for registration including biometric data associated with one or more secondary users; d) registering the biometric data associated with the secondary users with the user account; e) receiving a request for authentication for an article associated with the first user; f) receiving biometric data associated with the first user; g) transmitting a request for information including the biometric data associated with the first user; h) receiving a response to the request for information including user identifier data; i) comparing the biometric data associated with the first user with registered identifier data associated with the user account; j) identifying the secondary users associated with the user account; k) identifying one or more client devices associated with the secondary users; l) generating a prompt for user input associated with biometric data associated with the secondary users; m) transmitting the prompt for user input; n) receiving the biometric data associated with the secondary users; o) obtaining biometric data associated with the secondary users; p) receiving the biometric data associated with the secondary users; q) transmitting a request for information including the biometric data associated with the secondary users; r) receiving a response to the request for information including user identifier data; s) comparing the biometric data associated with the secondary users with registered identifier data associated with the user account; t) determining whether to approve the request for authentication; u) generating an authentication token for generating an authenticated article; and v) coupling the authentication token to the article.

FIG. 1 is a block diagram illustrating an example system 100 for processing one or more transactions. The system 100 includes a system server 110 configured to manage one or more articles (e.g., documents) 112 for processing the transactions. The system server 110 may be a single computing device or a plurality of interconnected computing devices that operate together to perform a particular function. That is, the system server 110 may be contained within a single hardware unit or be distributed among several or many different hardware units, including in the "cloud."

The system server 110 includes an authentication system 120 that allows an authenticated article (e.g., authenticated document) 122 to be generated. In some embodiments, the authentication system 120 includes, stores, or has access to one or more user accounts 124 associated with one or more users 130. The authentication system 120 may be used to confirm one or more identities of the users 130 for processing one or more transactions. In some embodiments, a user account 124 is associated with a first user 132. Additionally, the user account 124 may be associated with one or more second or secondary users 134 that may serve as one or more witnesses for the transaction. For example, a secondary user 134 may recognize or identify that the document 112 is associated with the first user 132 (e.g., the document 112 is physically or electronically signed by the first user 132) and, based on the identification, attest that the document 112 is associated with the first user 132. Confirming an identity of the first user 132 and/or the secondary user 134 associated with the user account 124 enables the document 112 to be authenticated for generating an authenticated document 122 with at least some confidence.

The user account 124 includes or is associated with user identifier data 136 that may be used to identity a user 130 as a first user 132 associated with the user account 124 or as a secondary user 134 associated with the user account 124. The first user 132 may be associated with a first access level (e.g., have a first set of permissions for using the user account 124), and the secondary user 134 may be associated with a second access level (e.g., have a second set of permissions for using the user account 124) different from the first access level. For example, a first user 132 may be allowed to access, use, and/or modify data associated with the user account 124, and/or a secondary user 134 may be allowed to attest a fact associated with the document 112 and/or with the first user 132 (e.g., the document 112 is associated with the first user 132).

User identifier data may include any data that identifies a user 130 including, for example, a name, a username, a government-issued identifier, an electronic mail (email) address, a cardholder identifier, or any other data that may be used to determine or confirm an identity of the user 130. In some embodiments, user identifier data does not include biometric data. For example, in at least some instances, the user account 124 and/or user identifier data 136 may not include biometric data 138 (e.g., registered biometric data). Biometric data may include or be associated with, for example, a photograph, a fingerprint, an iris scan, a retinal scan, a voice print, an ear scan, a deoxyribonucleic acid (DNA) profile, or any other feature that may be used to determine an identity of a user 130. Alternatively, in at least some other instances, the user account 124 or user identifier data 136 includes or is associated with registered biometric data 138.

In some embodiments, a user 130 is associated with a client device 140. For example, the user account 124 may include or be associated with device identifier data that may be used to identify a first client device 142 and associate the first client device 142 with a first user 132, and/or to identify a second or secondary client device 144 and associate the secondary client device 144 with a secondary user 134. Device identifier data may include any data that identifies a client device 140 including, for example, an interne protocol (IP) address, a media access control (MAC) address, a serial number, a unique device identifier (UDID), a telephone number (e.g., a mobile telephone number), or any other data that may be used to determine or confirm an identity of the client device 140. In this manner, when the first client device 142 is identified as accessing or using the user account 124, it may be presumed that the first user 132 is using the user account 124, and/or when the secondary client device 144 is identified as accessing or using the user account 124, it may be presumed that the secondary user 134 is using the user account 124.

A user 130 may utilize any client device 140, including a client device 140 that is not associated with the user 130. For example, the first user 132 may utilize the secondary client device 144 to access or use the user account 124. Additionally or alternatively, the secondary user 134 may utilize the first client device 142 to access or use the user account 124. In at least some instances, the first user 132 and the secondary user 134 may utilize a common client device. The first client device 142 and/or the secondary client device 144 may be any computing device configured to communicate with another computing device including, without limitation, a mobile device, a portable media player, a phablet, a tablet, a netbook, a laptop, a desktop computer, and the like.

The client device 140 is configured to receive user input from a user 130 and generate data corresponding to the user input. In some embodiments, the client device 140 includes, is coupled to, or is associated with a scanner system 150 configured to detect a characteristic or feature of a target (e.g. biometric feature) and generate scan data 152 (e.g., biometric data) corresponding to the feature of the target. The scan data 152 may be used to determine whether a user 130 is allowed to access or use the client device 140 for performing one or more functions. For example, scan data 152 may be compared with one or more registered credentials associated with a client device 140 to determine whether a user 130 is authorized to use the client device 140. If the scan data 152 matches or corresponds to registered credentials associated with the client device 140, it may be determined that the user 130 is authorized to use the client device 140 to perform one or more functions. On the other hand, if the scan data 152 does not correspond to registered credentials associated with the client device 140, other scan data 152 may be obtained to determine that the user 130 is authorized to use the client device 140.

In some embodiments, the system 100 includes a biometric system 160 that includes, stores, or has access to user identifier data 162 and registered biometric data 164 (e.g., biometric data) associated with the user identifier data 162. A user 130 registered with the biometric system 160 may have user identifier data 162 and/or registered biometric data 164 registered with the biometric system 160. User identifier data 162 and/or registered biometric data 164 may be accumulated or collected from a plurality of users 130. In some embodiments, the user identifier data 162 and/or registered biometric data 164 are collected by an entity other than an entity associated with the system server 110, and the biometric system 160 is remote or distinct from the system server 110. For example, the biometric system 160 may be associated with a government agency that includes, stores, and/or has access to various types of data, including a government-issued identifier and/or demographic data. Alternatively, at least some user identifier data 162 and/or registered biometric data 164 may be collected by an entity associated with the system server 110, and/or at least a portion of the biometric system 160 may be integrated or included in the system server 110. For example, scan data 152 confirmed to be associated with a user 130 may be registered with the biometric system 160 as registered biometric data 164.

The biometric system 160 may be used to determine or confirm an identity of a user 130 based on scan data 152. For example, the biometric system 160 may receive a request for information including scan data 152, and compare the scan data 152 with registered biometric data 164 to determine whether the scan data 152 matches or corresponds to registered biometric data 164. If the scan data 152 corresponds to registered biometric data 164, user identifier data 162 associated with the registered biometric data 164 may be used to determine or confirm an identity of the user 130. On the other hand, if the scan data 152 does not correspond to registered biometric data 164, other user input may be provided to determine or confirm an identity of the user 130.

In some embodiments, a client device 140 includes or is associated with one or more digital wallets that allow a user 130 to enter into and manage one or more transactions. For example, the first user 132 may use the first client device 142 to access or utilize one or more digital wallets associated with the first user 132, and/or the secondary user 134 may use the secondary client device 144 to access one or more digital wallets associated with the secondary user 134. To determine whether a user 130 is associated with or authorized to access a digital wallet, the system server 110 may receive a request for access including login credentials (e.g., wallet identifier, password), and compare the login credentials with one or more registered credentials associated with the digital wallets to determine whether a user 130 is authorized to access or use the digital wallet. If the login credentials match or correspond to registered credentials associated with a digital wallet, it may be determined that the user 130 is authorized to use the digital wallet to perform one or more functions. On the other hand, if the login credentials do not correspond to registered credentials, other login credentials may be obtained to determine that the user 130 is authorized to use the digital wallet.

A digital wallet may include or be associated with one or more wallet capsules configured to communicate with one or more computing devices to perform one or more functions. The wallet capsule includes or is associated with capsule data that is stored and maintained at one or more computing devices, including a client device 140 and/or the system server 110. For example, at least a portion of capsule data associated with a client-oriented wallet capsule may be stored and maintained at the client device 140, and at least a portion of capsule data associated with a server-oriented wallet capsule may be stored and maintained remote from the client device (e.g., at the system server 110).

In some embodiments, a first wallet capsule allows a user 130 to communicate with a document system 170 to access and/or use a document 112 or form. For example, a first user 132 may utilize a wallet capsule at a first client device 142 to obtain a digital or electronic copy of the form, modify the content of the form, and/or indicate an approval of or agreement with the content of the form. Additionally or alternatively, a secondary user 134 may utilize the wallet capsule at the first client device 142, the wallet capsule at a secondary client device 144, and/or another wallet capsule at the secondary client device 144 to obtain an electronic copy of the form, modify the content of the form, indicate an approval of or agreement with the content of the form, and/or attest a fact associated with the form and/or with the first user 132. In some embodiments, the document system 170 is integrated or included in the system server 110. Alternatively, at least some portions of the document system 170 may be remote or distinct from the system server 110.

In some embodiments, a second wallet capsule may allow a user 130 to communicate with a cardholder system 180 to enter into one or more financial transactions. For example, a first user 132 may utilize the second wallet capsule to purchase an electronic copy of the form, and utilize the first wallet capsule to obtain the electronic copy of the form. The cardholder system 180 includes, stores, or has access to one or more cardholder accounts 182 associated with one or more users 130, and is configured to determine whether to authorize one or more financial transactions associated with a cardholder account 182. For example, the system server 110 may receive a request for authorization for a financial transaction from another computing device (e.g., merchant device, client device 140), determine whether to approve the request for authorization, and, based on the determination, generate a response to the request for authorization for transmission to another computing device. In some embodiments, the cardholder system 180 is integrated or included in the system server 110. Alternatively, at least some portions of the cardholder system 180 may be remote or distinct from the system server 110.

The system 100 includes one or more communication networks 190 that enable data to be transferred between a plurality of computing devices (e.g., system server 110, authentication system 120, client device 140, scanner system 150, biometric system 160, document system 170, cardholder system 180) coupled to the communication network 190. Example communication networks 190 include a cellular or mobile network and the Internet. Alternatively, the communication network 190 may be any communication medium that enables the system 100 to function as described herein including, for example, a personal area network (PAN), a LAN, and/or a WAN.

Figure 2:
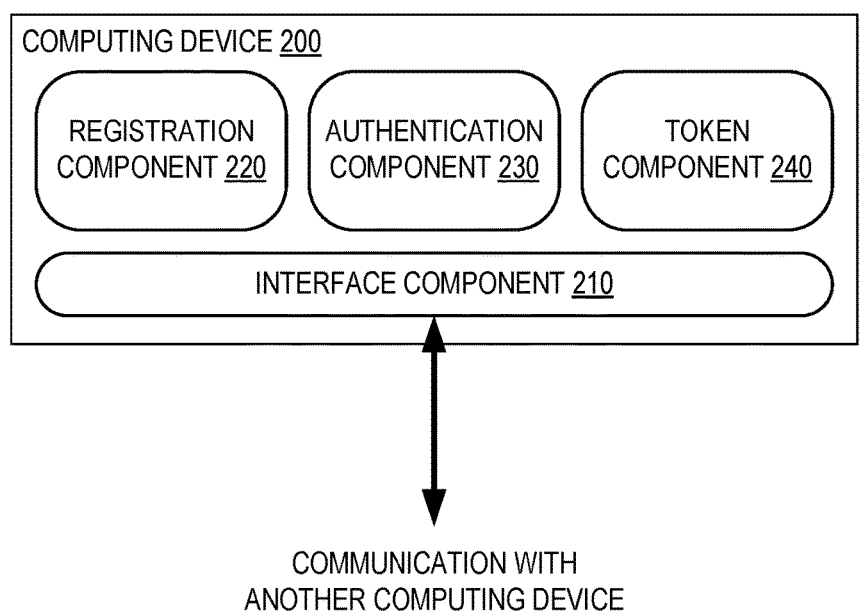
FIG. 2 is a block diagram illustrating an example computing device including a plurality of components that may be used to confirm an identity of a user associated with an article for processing one or more transactions.

FIG. 2 is a block diagram illustrating an example computing device 200 (e.g., system server 110, authentication system 120) for confirming an identity of a user 130. For example, the computing device 200 may be used to register one or more users 130 with a user account 124, and confirm one or more identities of one or more users 130 associated with a document 112 for processing one or more transactions. To enable the computing device 200 to process the transactions, the computing device 200 may include, for example, an interface component 210, a registration component 220, an authentication component 230, and/or a token component 240.

The interface component 210 enables the computing device 200 to communicate with another computing device, such as a first client device 142 (shown in FIG. 1), a secondary client device 144 (shown in FIG. 1), a scanner system 150 (shown in FIG. 1), a biometric system 160 (shown in FIG. 1), a document system 170 (shown in FIG. 1), and/or a cardholder system 180 (shown in FIG. 1). For example, the interface component 210 may be configured to communicate with a first client device 142 to receive a registration request (a request for registration), transmit a response to the registration request, receive an authentication request (a request for authentication), and/or transmit a response to the authentication request. For another example, the interface component 210 may be configured to communicate with a secondary client device 144 to transmit a registration confirmation request (a request for registration confirmation), receive a response to the registration confirmation request, transmit an authentication challenge (a request to provide authentication), and/or receive a response to the authentication challenge. For yet another example, the interface component 210 may be configured to communicate with a biometric system 160 to transmit a registration request (a request for registration), receive a response to the registration request, transmit an information request (a request for information), and/or receive a response to the information request.

The interface component 210 may be coupled to a communication network 190 (shown in FIG. 1) to facilitate communication between the computing device 200 and another computing device (e.g., client device 140, scanner system 150, biometric system 160, document system 170, cardholder system 180) via the communication network 190. In some embodiments, the interface component 210 is coupled to and/or communicates with the registration component 220, the authentication component 230, and/or the token component 240 to facilitate communication between the interface component 210, the registration component 220, authentication component 230, and/or the token component 240.

The registration component 220 enables the computing device 200 to register a user 130 with an account, such as a user account 124 (shown in FIG. 1), and/or with a system, such as a biometric system 160 (shown in FIG. 1). The registration component 220 may receive (e.g., via the interface component 210), for example, a registration request including user identifier data and/or scan data 152 from a client device 140 (e.g., first client device 142), and, upon registering the user 130, transmit (e.g., via the interface component 210) a response to the registration request indicative of a successful registration to the client device 140. Additionally or alternatively, the registration component 220 may identify a secondary user 134 and/or a secondary client device 144 associated with the secondary user 134, transmit (e.g., via the interface component 210) a registration confirmation request to the secondary client device 144, and receive (e.g., via the interface component 210) a response to the registration confirmation request including user identifier data and/or scan data 152 from the secondary client device 144.

The registration component 220 is configured to obtain (e.g., via the interface component 210) user identifier data and/or biometric data (e.g., scan data 152) associated with the user 130, and/or register the user 130 with the user account 124 such that the user identifier data and/or scan data 152 are associated with the user account 124. Upon registering the user 130 with the user account 124, the user identifier data and/or scan data 152 may be identified as user identifier data 136 and/or registered biometric data 138, respectively. In this manner, a user 130 associated with a subsequent presentation of user identifier data and/or scan data 152 that matches or corresponds to the user identifier data 136 and/or registered biometric data 138, respectively, may be identified as being authorized to access or use the user account 124. The first user 132 may be registered with the user account 124 such that the first user 132 is identifiable as being an authorized user, and/or the secondary user 134 may be registered with the user account 124 such that the secondary user 134 is identifiable as being an authorized witness.

Additionally or alternatively, the user 130 may be registered with the biometric system 160 such that the user identifier data and/or scan data 152 are associated with the biometric system 160. In some embodiments, the registration component 220 transmits (e.g., via the interface component 210) a registration request including the user identifier data and/or scan data 152 to the biometric system 160, at which the user identifier data and/or scan data 152 is registered, and/or receives (e.g., via the interface component 210) a response to the registration request indicative of a successful registration from the biometric system 160. Upon registering the user 130 with the biometric system 160, the user identifier data and/or scan data 152 may be identified, for example, as user identifier data 162 and/or registered biometric data 164, respectively. In this manner, a subsequent presentation of user identifier data or scan data 152 that matches or corresponds to the user identifier data 162 or registered biometric data 164, respectively, may prompt the other of the user identifier data 162 or registered biometric data 164 to be provided for confirming an identity of a user 130.

The authentication component 230 enables the computing device 200 to confirm an identity of one or more users 130. For example, the authentication component 230 may be configured to obtain (e.g., via the interface component 210) scan data 152 associated with one or more users 130, and/or identify user identifier data 136 associated with the users 130 based on the scan data 152. In some embodiments, the authentication component analyzes an authentication request to identify the scan data 152. Additionally or alternatively, the authentication component 230 may analyze a response to an authentication challenge to identify the scan data 152.

In some embodiments, the authentication component 230 communicates (e.g., via the interface component 210) with a biometric system 160 to identify user identifier data 162 associated with scan data 152. For example, the authentication component 230 may transmit (e.g., via the interface component 210) an information request including the scan data 152 to the biometric system 160, at which user identifier data 162 associated with registered biometric data 164 that matches or corresponds to the scan data 152 is identified, and receive (e.g., via the interface component 210) a response to the information request including the user identifier data 162.

The authentication component 230 is configured to determine whether a user 130 is associated with a user account 124 based on the user identifier data 162 and/or scan data 152. For example, the authentication component 230 may compare the user identifier data 162 and/or scan data 152 with user identifier data 136 and/or registered biometric data 138, respectively, to determine whether the user 130 is authorized to access the user account 124 (e.g., as an authorized user, as an authorized witness). If the user identifier data 162 and/or scan data 152 matches or corresponds to user identifier data 136 and/or registered biometric data 138, respectively, the user 130 may be confirmed as being an authorized user (e.g., a first user 132) or as being an authorized witness (e.g., a secondary user 134). On the other hand, if the user identifier data 162 and/or scan data 152 does not correspond to user identifier data 136 and/or registered biometric data 138, respectively, other user input may be provided to confirm an identity of the user 130.

The token component 240 enables the computing device 200 to generate an authentication token for generating an authenticated document 122. For example, the token component 240 may be configured to determine whether a first quantity of users 130 confirmed as being a first user 132 and/or a second quantity of users 130 confirmed as being a secondary user 134 satisfy one or more predetermined thresholds and, on condition the predetermined thresholds are satisfied, determine whether to generate an authentication token. In some embodiments, a document 112 includes one or more indicators associated with a confirmation of one or more users 130 as a first user 132 and/or as a secondary user 134, and the token component 240 may analyze the document 112 to determine whether the predetermined thresholds are satisfied based on an identification of the indicators.

The authentication token may be generated, for example, upon identifying that the first quantity satisfies a first predetermined quantity of users 130 confirmed as being a first user 132 (e.g., one) and/or the second quantity satisfies a second predetermined quantity of users 130 confirmed as being a secondary user 134 (e.g., one, two). If the predetermined thresholds are satisfied, the token component 240 may approve the authentication request, couple the authentication token to the document 112 to generate the authenticated document 122, and/or transmit (e.g., via the interface component 210) a response to the authentication request including the authenticated document 122 to a client device 140 (e.g., the first client device 142). Alternatively, the response to the authentication request may include the authentication token, and the response to the authentication request may be transmitted (e.g., via the interface component 210) to the first client device 142 for generating the authenticated document 122 at the first client device 142. In this manner, the authentication token may be indicative of an authentication process for a document 112 being satisfied or completed, including obtaining approval or support from a first predetermined quantity of first users 132 (e.g., the first users 132 have indicated an approval of or agreement with the content of the document 112) and/or from a second predetermined quantity of secondary users 134 (e.g., the secondary users 134 have indicated an attestation of a fact associated with the document 112 and/or with the first user 132).

Figure 3:
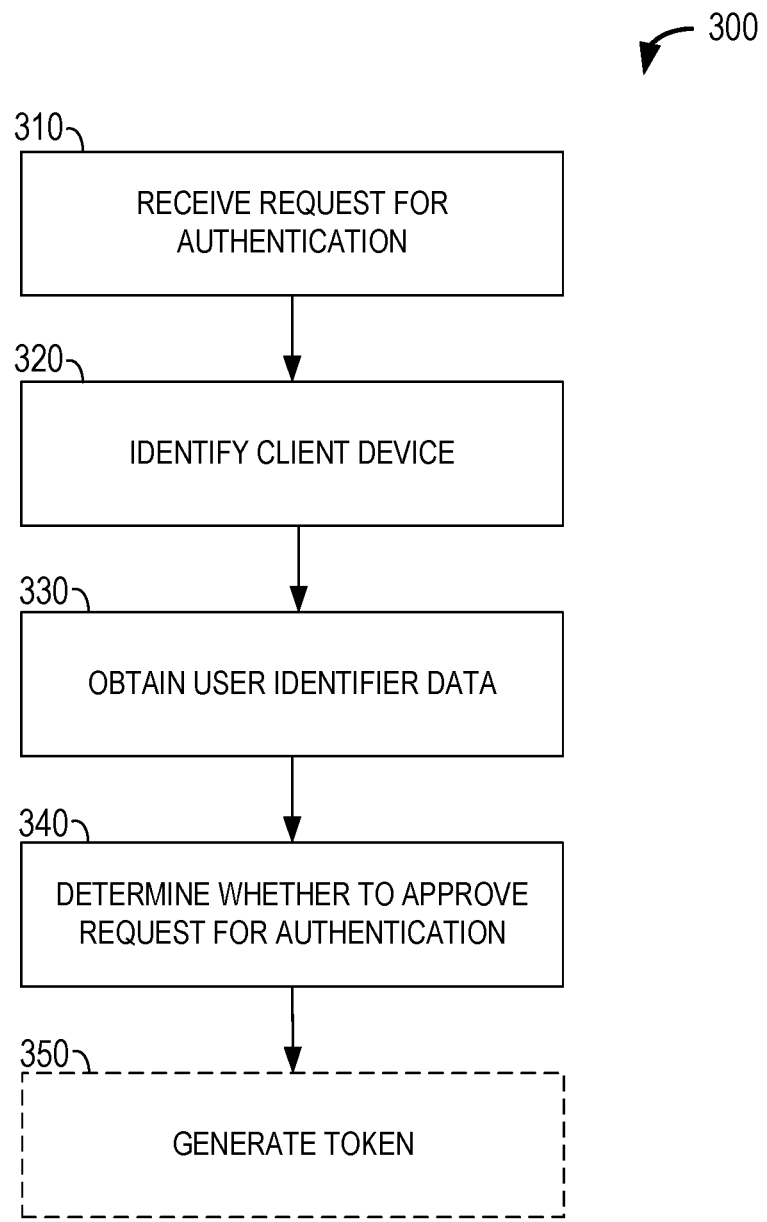
FIG. 3 is a flowchart of an example method that may be used for confirming an identity of a user associated with an article using a computing device, such as the computing device shown in FIG. 2.

FIG. 3 is a flowchart of an example method 300 that may be used for confirming an identity of a user 130 associated with a document 112 using a computing device 200 (shown in FIG. 2). The computing device 200 receives at 310 a request for authentication from a first client device 142. For example, the document 112 may be uploaded to the computing device 200 for authentication. The request for authentication may include data generated based on user input received at the first client device 142. For example, the request for authentication may include user identifier data and/or scan data 152 that may be used to determine or confirm an identity of a user 130 of the first client device 142 (e.g., first user 132).

In some embodiments, the computing device 200 compares user identifier data and/or scan data 152 included in or associated with the request for authentication with user identifier data 136 and/or registered biometric data 138 to determine whether the first user 132 is associated with a user account 124 as an authorized user. Additionally or alternatively, scan data 152 associated with the request for authentication may be transmitted to a biometric system 160, at which user identifier data 162 associated with registered biometric data 164 that matches or corresponds to the scan data 152 is identified, and the user identifier data 162 associated with the scan data 152 may be received for determining whether the first user 132 is associated with the user account 124 as an authorized user. For example, the user identifier data 162 may be compared with user identifier data 136 to determine whether the first user 132 is associated with the user account 124 as an authorized user.

In some embodiments, the computing device 200 obtains scan data 152 associated with a secondary user 134 that may attest that the document 112 is associated with the first user 132. The secondary user 134 may attest, for example, that the first user 132 is or has been confirmed to be associated with the user account 124 and/or that the document 112 includes an indicator (e.g., a signature) that is indicative of the first user 132 approving or agreeing with the content of the document 112. To obtain scan data 152 from the secondary user 134, the computing device 200 may communicate with a client device 140 (e.g., first client device 142, secondary client device 144) to present a prompt for user input at the client device 140, and the secondary user 134 may present a biometric feature to the client device 140 such that scan data 152 associated with the secondary user 134 may be generated at and obtained from the client device 140.

To determine whether the scan data 152 associated with the secondary user 134 is obtained or to be obtained utilizing the first client device 142 and/or the secondary client device 144, the computing device 200 may analyze the request for authentication to identify device identifier data for identifying at 320 the first client device 142 and/or the secondary client device 144. Additionally or alternatively, the device identifier data may be identified by accessing data associated with the user account 124. For example, the computing device 200 may analyze the request for authorization to identify user identifier data, and compare the user identifier data with user identifier data 136 to identify the user account 124 including or associated with user identifier data 136 that matches or corresponds to the user identifier data included in or associated with the request for authentication for accessing the user account 124 to identify device identifier data associated with the user account 124.

The scan data 152 may be used to obtain at 330 user identifier data associated with the scan data 152. In some embodiments, the computing device 200 generates a request for information including the scan data 152, and communicates with a biometric system 160 to obtain user identifier data 162 based on the scan data 152. For example, a request for information including the scan data 152 may be transmitted to the biometric system 160, at which user identifier data 162 associated with registered biometric data 164 that matches or corresponds to the scan data 152 is identified, and a response to the request for information including the user identifier data 162 may be received from the biometric system 160.

Based on the user identifier data 162, it is determined at 340 whether to approve the request for authentication. In some embodiments, the computing device 200 may approve the request for authentication upon determining that the first user 132 is an authorized user. For example, the computing device 200 may identify that the document 112 includes an indicator that is indicative of the first user 132 being confirmed to be associated with the user account 124 as an authorized user. Additionally or alternatively, the request for authentication may be approved upon identifying that the document 112 includes an indicator that is indicative of the first user 132 approving or agreeing with the content of the document 112.

If the document 112 includes one or more portions associated with a secondary user 134 for attesting a fact associated with the document 112 and/or with the first user 132, the computing device 200 may approve the request for authentication upon determining that the secondary user 134 is an authorized witness. For example, the computing device 200 may identify that the document 112 includes an indicator that is indicative of the secondary user 134 being confirmed to be associated with the user account 124 as an authorized witness. In some embodiments, the computing device 200 utilizes the user identifier data 162 to determine or confirm an identity of the secondary user 134. For example, the user identifier data 162 may be compared with user identifier data 136 associated with the user account 124 to determine whether the secondary user 134 is associated with the user account 124 as an authorized witness. Additionally or alternatively, the request for authentication may be approved upon identifying that the document 112 includes an indicator that is indicative of the secondary user 134 attesting that the first user 132 is or has been confirmed to be associated with the user account 124 and/or that the document 112 includes an indicator (e.g., a signature) that is indicative of the first user 132 approving or agreeing with the content of the document 112. In some embodiments, the computing device 200 may generate a time stamp associated with a time of approving or declining the request for authentication.

Upon approving the request for authentication, the computing device 200 may generate at 350 an authentication token, and couple the authentication token with the document 112 to generate an authenticated document 122. In some embodiments, the computing device 200 generates a response to the request for authentication including the authenticated document 122, and transmits the response to the authentication to the first client device 142. Alternatively, the authentication token may be transmitted to the first client device 142, at which the authentication token is coupled to the document 112 to generate an authenticated document 122.

Figure 4:
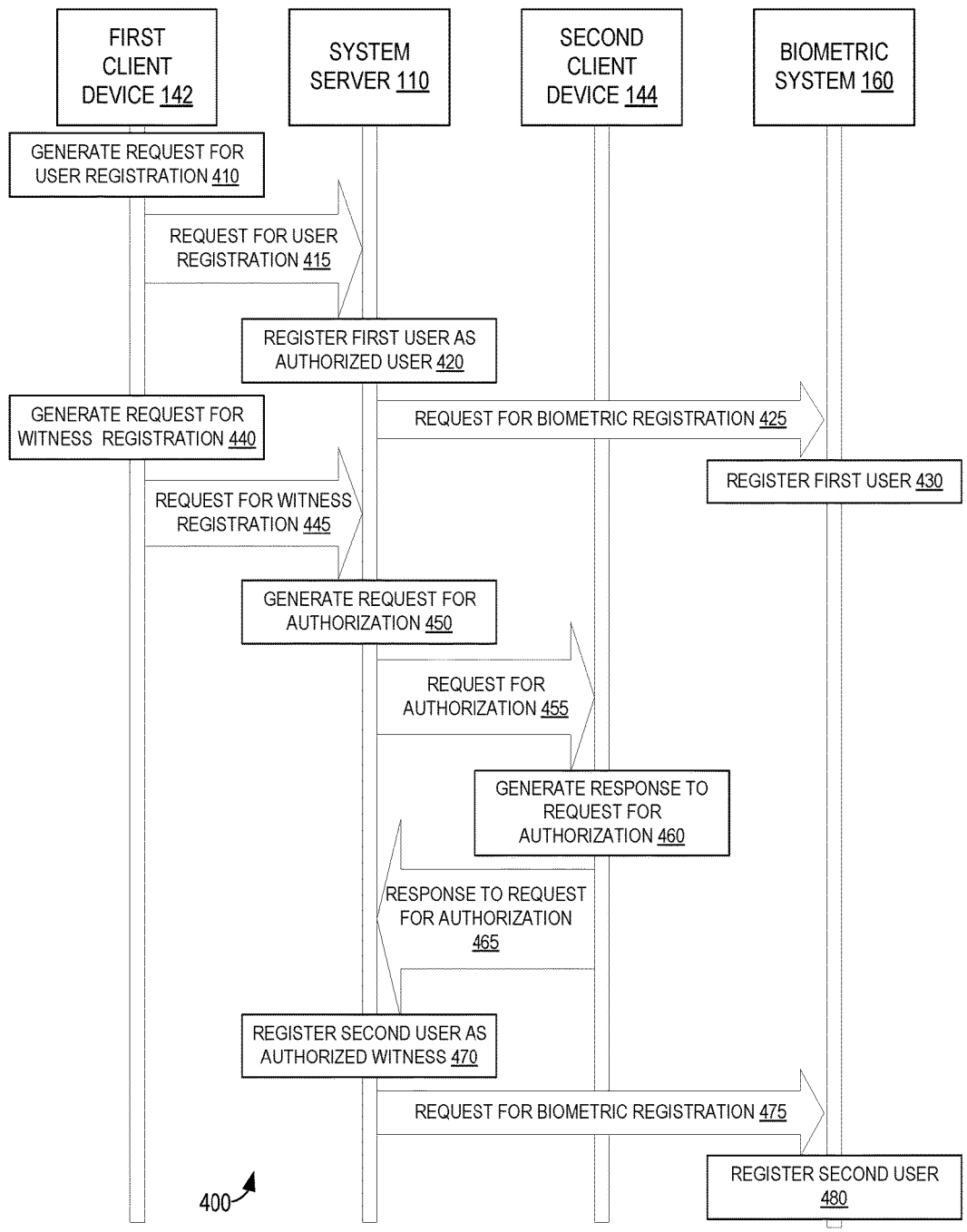
FIG. 4 is a sequence diagram for registering a plurality of users for confirming an identity of a user associated with an article in a system, such as the system shown in FIG. 1.

FIG. 4 is a sequence diagram 400 for registering a plurality of users 130 for confirming an identity of a user 130 associated with a document 112 in a system 100 (shown in FIG. 1). In some embodiments, a client device 140 (e.g., a first client device 142) downloads an application for entering into one or more transactions. For example, the first client device 142 may be used to register one or more users 130 associated with a transaction as an authorized user and/or as an authorized witness. The application may be usable with, for example, a digital wallet and/or a wallet capsule to enter into the transactions.

In some embodiments, the first client device 140 generates at 410 a request for user registration including user identifier data and/or scan data 152, and transmits at 415 the request for user registration to a system server 110. In response to receiving the request for user registration, the system server 110 may analyze the request for user registration to identify the user identifier data, and register at 420 a first user 132 with a user account 124 as an authorized user associated with the user account 124. For example, the user identifier data and/or scan data 152 included in or associated with the request for user registration may be associated with the user account 124 such that the user identifier data and/or scan data 152 are identified as user identifier data 136 and/or registered biometric data 138, respectively. In some embodiments, the system server 110 generates and/or transmits a response to the request for user registration that indicates a registration status to the first client device 142.

Additionally or alternatively, the request for user registration may be analyzed to generate or identify a request for biometric registration including scan data 152 associated with the first user 132. The system server 110 may transmit at 425 the request for biometric registration to the biometric system 160. Alternatively, the request for biometric registration may be transmitted to the biometric system 160 directly from the first client device 142. In response to receiving the request for biometric registration, the biometric system 160 may process the request for biometric registration, and register at 430 the first user 132 with the biometric system 160. For example, the scan data 152 included in or associated with the request for biometric registration may be associated with the biometric system 160 such that the scan data 152 is identified as registered biometric data 164. In some embodiments, the biometric system 160 and/or system server 110 generates and/or transmits a response to the request for biometric registration that indicates a registration status.

In some embodiments, the first client device 140 generates at 440 a request for witness registration including device identifier data and/or user identifier data, and transmits at 445 the request for witness registration to the system server 110. In response to receiving the request for witness registration, the system server 110 may analyze the request for witness registration to identify a client device 140 (e.g., secondary client device 144) for registering a secondary user 134 as an authorized witness associated with the user account 124. For example, the system server 110 may generate at 450 a request for authorization for witness registration including a prompt for user input, and transmit at 455 the request for authorization for witness registration to the secondary client device 144.

In response to receiving the request for authorization for witness registration, the secondary client device 144 may present the prompt for user input for generating user identifier data and/or scan data 152. In some embodiments, the secondary client device 144 generates at 460 a response to the request for authorization for witness registration including the user identifier data and/or scan data 152, and transmits at 465 the response to the request for authorization for witness registration to the system server 110. Alternatively, the system server 110 may communicate with any client device 140, including the first client device 142, regarding the authorization of a witness registration.

In response to receiving the response to the request for authorization for witness registration, the system server 110 registers at 470 the secondary user 134 with the user account 124 as an authorized witness associated with the user account 124. For example, the user identifier data and/or scan data 152 included in or associated with the response to the request for authorization for witness registration may be associated with the user account 124 such that the user identifier data and/or scan data 152 are identified as user identifier data 136 and/or registered biometric data 138, respectively. In some embodiments, the system server 110 generates and/or transmits a response to the request for witness registration that indicates a registration status to the first client device 142.

Additionally or alternatively, the request for witness registration may be analyzed to generate or identify a request for biometric registration including scan data 152 associated with the secondary user 134. The system server 110 may transmit at 475 the request for biometric registration to the biometric system 160. Alternatively, the request for biometric registration may be transmitted to the biometric system 160 directly from a client device 140 associated with the secondary user 134. In response to receiving the request for biometric registration, the biometric system 160 may process the request for biometric registration, and register at 480 the secondary user 134 with the biometric system 160.

Figure 5:
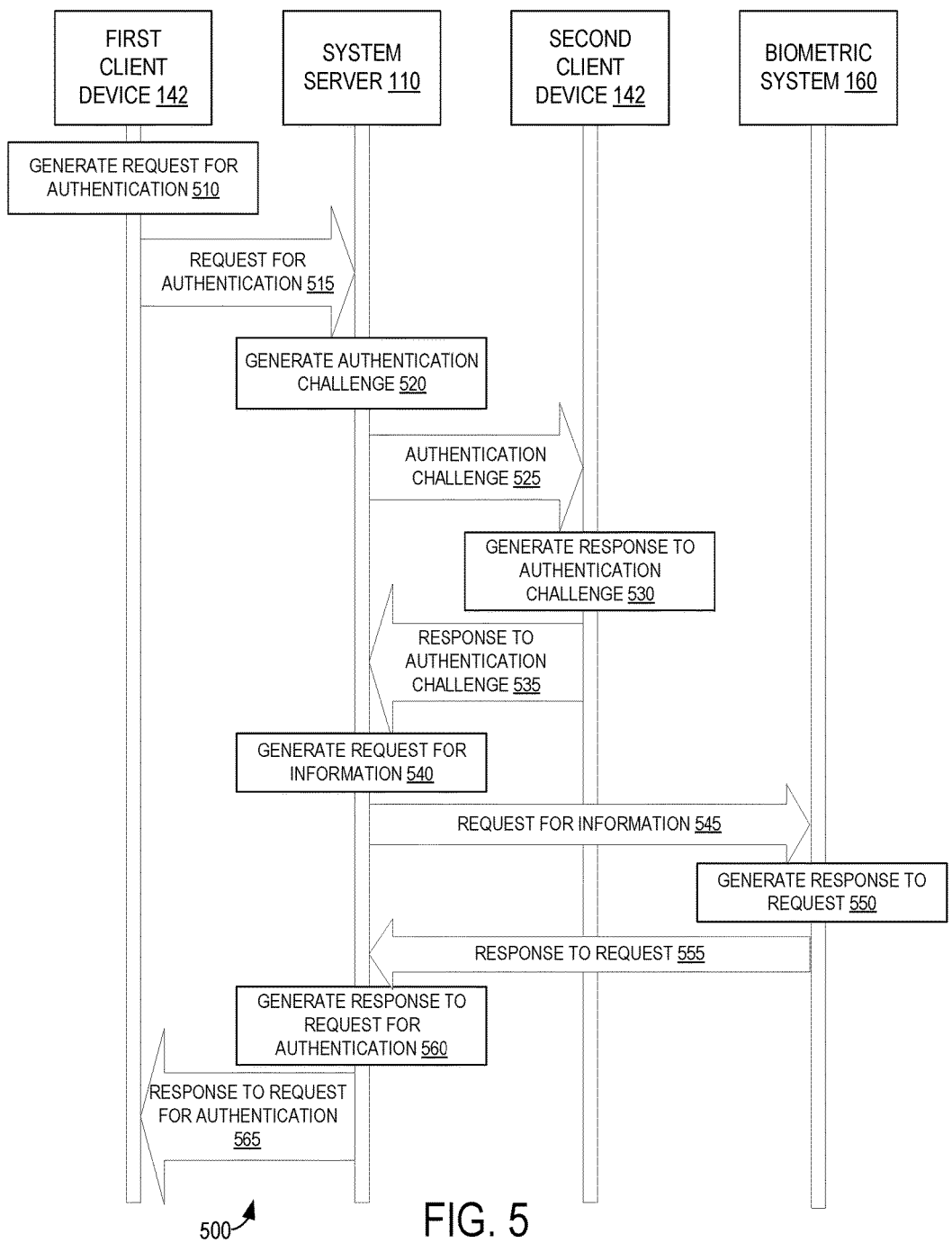
FIG. 5 is a sequence diagram for confirming an identity of a user associated with an article for processing one or more transactions in a system, such as the system shown in FIG. 1.

FIG. 5 is a sequence diagram 500 for confirming an identity of a user 130 associated with a document 112 for processing one or more transactions in a system 100 (shown in FIG. 1). In some embodiments, a client device 140 (e.g., a first client device 142) downloads an application for entering into one or more transactions. For example, the first client device 142 may be used to purchase or obtain a document 112 including one or more portions associated with one or more secondary users 134 (e.g., witnesses) for attesting a fact associated with the document 112 and/or with a user 130 of the first client device 142 (e.g., first user 132). The application may be usable with, for example, a digital wallet and/or a wallet capsule to enter into the transactions.

The first client device 142 may be utilized to modify the document 112. For example, the first user 132 may utilize the first client device 142 to sign or indicate an approval of or agreement with the content of the document 112. In some embodiments, the document 112 may be signed using user identifier data and/or scan data 152 associated with the first user 132. The first client device 142 generates at 510 a request for authentication including user identifier data and/or scan data 152 associated with the first user 132, and transmits at 515 the request for authentication to the system server 110. In some embodiments, the request for authentication includes device identifier data and/or user identifier data associated with a secondary user 134 for attesting a fact associated with the document 112 and/or with the first user 132.

In response to receiving the request for authentication, the system server 110 determines whether to approve the request for authorization. In some embodiments, the system server 110 generates at 520 an authentication challenge including a prompt for user input, and transmits at 525 the authentication challenge to a client device 140 associated with the secondary user 134. For example, the system server 110 may utilize the device identifier data and/or user identifier data associated with the secondary user 134 to identify the secondary client device 144. Alternatively, the system server 110 may communicate with the secondary user 134 at the first client device 142.

In response to receiving the authentication challenge, the secondary client device 144 may present the prompt for user input for generating scan data 152 associated with the secondary user 134. In some embodiments, the secondary client device 144 generates at 530 a response to the authentication challenge including the scan data 152, and transmit at 535 the response to the authentication challenge to the system server 110. Upon receiving the response to the authentication challenge, the system server 110 may determine or confirm an identity of the secondary user 134 based on the scan data 152 associated with the secondary user 134 to determine whether the secondary user 134 is an authorized witness.

In some embodiments, the system server 110 generates at 540 a request for information including the scan data 152 associated with the secondary user 134, and transmits at 545 the request for information to a biometric system 160. Additionally or alternatively, the request for information may include scan data 152 associated with the first user 132. In response to receiving the request for information, the biometric system 160 compares the scan data 152 to registered biometric data to identify registered biometric data 164 that matches or corresponds to the scan data 152. In some embodiments, the biometric system 160 generates at 550 a response to the request for information including user identifier data 162 associated with the registered biometric data 164 that corresponds to the scan data 152, and transmits at 555 the response to the request for information to the system server 110.

The system server 110 may compare the user identifier data 162 with user identifier data 136 associated with a user account 124 to determine whether the first user 132 is associated with the user account 124 as an authorized user and/or whether the secondary user 134 is associated with the user account 124 as an authorized witness. Alternatively, scan data 152 associated with the first user 132 and/or with the secondary user 134 may be compared with registered biometric data 138 associated with the user account 124 to determine whether the first user 132 is an authorized user and/or whether the secondary user 134 is an authorized witness.

If a first predetermined quantity of authorized users and/or a second predetermined quantity of authorized witnesses are identified, the system server 110 generates an authentication token, and couples the authentication token with the document 112 to generate an authenticated document 122. The system server 110 may generate the authenticated document 122 upon identifying that that the first user 132 is associated with the user account 124 as an authorized user and/or that the secondary user 134 is associated with the user account 124 as an authorized witness. The authenticated document 122 may include, for example, one or more indicators that are indicative of the first user 132 approving or agreeing with the content of the document 112 and/or of the secondary user 134 attesting that the first user 132 has approved or agreed with the content of the document 112. A response to the request for authentication including the authenticated document 122 may be generated at 560 and transmitted at 565 to the first client device 142 and/or to another computing device (e.g., a document system 170 configured to process the document 112).

Figure 6:
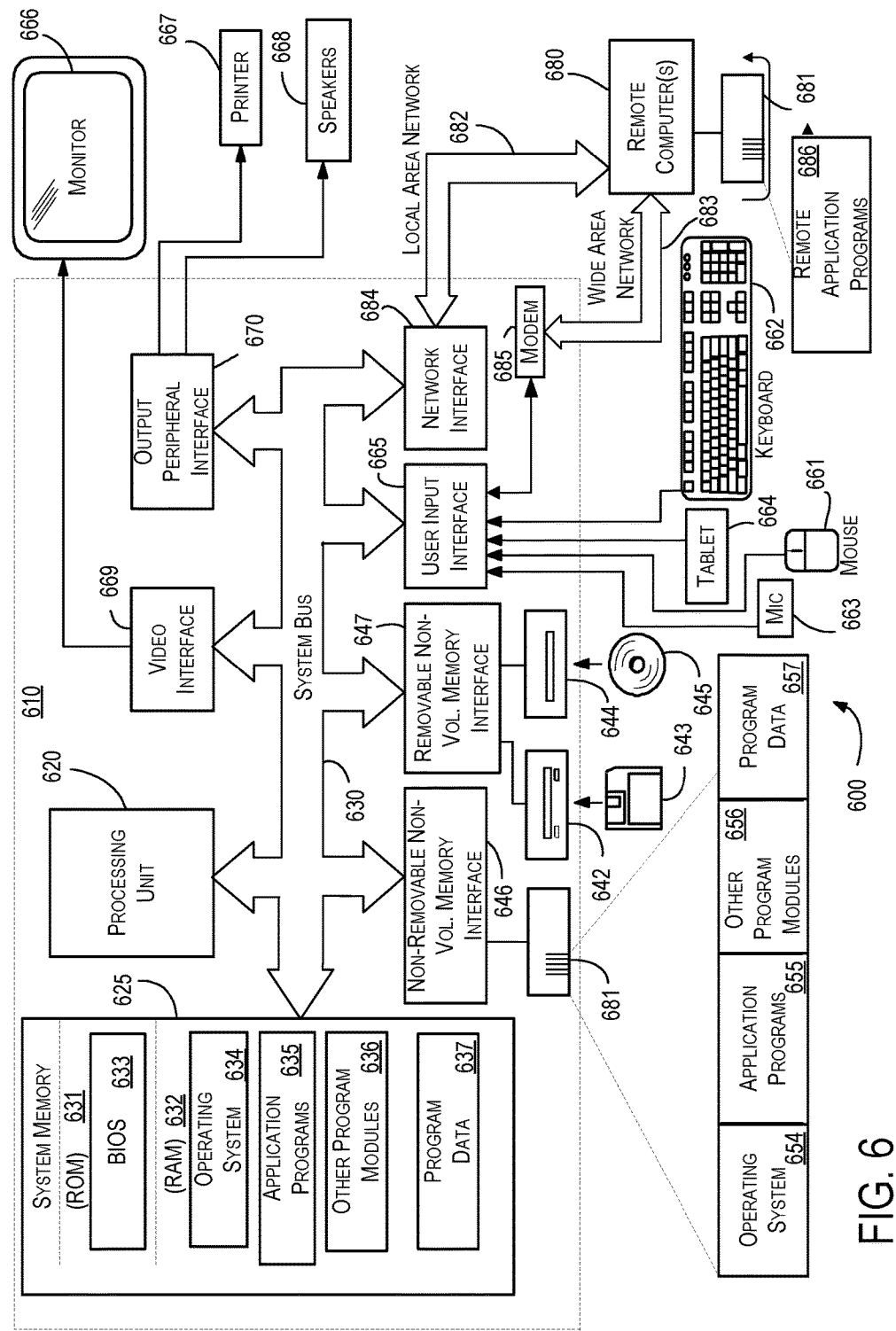
FIG. 6 is a block diagram of an example operating environment for processing one or more transactions.

FIG. 6 is a block diagram of an example operating environment 600 that may be used to process one or more transactions. The operating environment 600 is only one example of a computing and networking environment and is not intended to suggest any limitation as to the scope of use or functionality of the disclosure. The operating environment 600 should not be interpreted as having any dependency or requirement relating to any one or combination of components illustrated in the example operating environment 600.

The disclosure is operational with numerous other computing and networking environments or configurations. While some examples of the disclosure are illustrated and described herein with reference to the operating environment 600 being or including a system server 110 (shown in FIG. 1), an authentication system 120 (shown in FIG. 1), and/or a computing device 200 (shown in FIG. 2), aspects of the disclosure are operable with any computing device (e.g., client device 140, scanner system 150, biometric system 160, document system 170, cardholder system 180, interface component 210, registration component 220, authentication component 230, token component 240) that executes instructions to implement the operations and functionality associated with the operating environment 600.

For example, the operating environment 600 may include a mobile device, a mobile telephone, a phablet, a tablet, a portable media player, a netbook, a laptop, a desktop computer, a personal computer, a server computer, a computing pad, a kiosk, a tabletop device, an industrial control device, a multiprocessor system, a microprocessor-based system, a set top box, programmable consumer electronics, a network computer, a minicomputer, a mainframe computer, a distributed computing environment that include any of the above systems or devices, and the like. The operating environment 600 may represent a group of processing units or other computing devices. Additionally, any computing device described herein may be configured to perform any operation described herein including one or more operations described herein as being performed by another computing device.

With reference to FIG. 6, an example system for implementing various aspects of the disclosure may include a general purpose computing device in the form of a computer 610. Components of the computer 610 may include, but are not limited to, a processing unit 620 (e.g., a processor), a system memory 625 (e.g., a computer-readable storage device), and a system bus 630 that couples various system components including the system memory 625 to the processing unit 620. The system bus 630 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The system memory 625 includes any quantity of media associated with or accessible by the processing unit 620. For example, the system memory 625 may include computer storage media in the form of volatile and/or nonvolatile memory, such as read only memory (ROM) 631 and random access memory (RAM) 632. The ROM 631 may store a basic input/output system 633 (BIOS) that facilitates transferring information between elements within computer 610, such as during start-up. The RAM 632 may contain data and/or program modules that are immediately accessible to and/or presently being operated on by processing unit 620. For example, the system memory 625 may store computer-executable instructions, communication data, authentication data, application data, and other data.

The processing unit 620 may be programmed to execute the computer-executable instructions for implementing aspects of the disclosure, such as those illustrated in the figures (e.g., FIGS. 3-5). By way of example, and not limitation, FIG. 6 illustrates operating system 634, application programs 635, other program modules 636, and program data 637. The processing unit 620 includes any quantity of processing units, and the instructions may be performed by the processing unit 620 or by multiple processors within the operating environment 600 or performed by a processor external to the operating environment 600.

The system memory 625 may include computer-executable instructions, user identifier data, biometric data, cardholder account data, and other data. For example, the system memory 625 may include an interface component 210 (shown in FIG. 2), a registration component 220 (shown in FIG. 2), an authentication component 230 (shown in FIG. 2), and/or a token component 240 (shown in FIG. 2) for implementing aspects of the disclosure.

Upon programming or execution of these components, the operating environment 600 and/or processing unit 620 is transformed into a special purpose microprocessor or machine. For example, the interface component 210, when executed by the processing unit 620, causes the computer 610 to receive a request for authorization for an article associated with a first user, transmit a prompt for user input associated with biometric data for attesting the article is associated with the first user, and receive biometric data associated with one or more secondary users; the authentication component 230, when executed by the processing unit 620, causes the computer 610 to access the user account to identify one or more secondary client devices associated with the secondary users, and generating a prompt for user input associated with biometric data for attesting the article is associated with the first user; and/or the token component 240, when executed by the processing unit 620, causes the computer 610 to determine whether to approve the request for authentication and generate a token for generating an authenticated article. Although the processing unit 620 is shown separate from the system memory 625, embodiments of the disclosure contemplate that the system memory 625 may be onboard the processing unit 620 such as in some embedded systems.

The computer 610 includes a variety of computer-readable media. Computer-readable media may be any available media that may be accessed by the computer 610 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. ROM 631 and RAM 632 are examples of computer storage media. Computer storage media are tangible and mutually exclusive to communication media. Computer storage media for purposes of this disclosure are not signals per se. Example computer storage media includes, but is not limited to, hard disks, flash drives, solid state memory, RAM, ROM, electrically erasable programmable read-only memory (EEPROM), flash memory or other memory technology, CDs, DVDs, or other optical disk storage, magnetic cassettes, magnetic tape, magnetic disk storage or other magnetic storage devices, or any other medium which may be used to store the desired information and which may accessed by the computer 610. Computer storage media are implemented in hardware and exclude carrier waves and propagated signals. Any such computer storage media may be part of computer 610.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

A user may enter commands and information into the computer 610 through one or more input devices, such as a pointing device 661 (e.g., mouse, trackball, touch pad), a keyboard 662, a microphone 663, and/or an electronic digitizer 664 (e.g., tablet). Other input devices not shown in FIG. 6 may include a joystick, a game pad, a controller, a satellite dish, a camera, a scanner, an accelerometer, or the like. These and other input devices may be coupled to the processing unit 620 through a user input interface 665 that is coupled to the system bus 630, but may be connected by other interface and bus structures, such as a parallel port, game port or a universal serial bus (USB).

Information, such as text, images, audio, video, graphics, alerts, and the like, may be presented to a user via one or more presentation devices, such as a monitor 666, a printer 667, and/or a speaker 668. Other presentation devices not shown in FIG. 6 may include a projector, a vibrating component, or the like. These and other presentation devices may be coupled to the processing unit 620 through a video interface 669 (e.g., for a monitor 666 or a projector) and/or an output peripheral interface 670 (e.g., for a printer 667, a speaker 668, and/or a vibration component) that are coupled to the system bus 630, but may be connected by other interface and bus structures, such as a parallel port, game port or a USB. In some embodiments, the presentation device is integrated with an input device configured to receive information from the user (e.g., a capacitive touchscreen panel, a controller including a vibrating component). Note that the monitor 666 and/or touch screen panel may be physically coupled to a housing in which the computer 610 is incorporated, such as in a tablet-type personal computer.

The computer 610 may operate in a networked environment using logical connections to one or more remote computers, such as a remote computer 680. The remote computer 680 may be a personal computer, a server, a router, a network PC, a peer device or other common network node, and typically includes many or all of the elements described above relative to the computer 610, although only a memory storage device 681 has been illustrated in FIG. 6. The logical connections depicted in FIG. 6 include one or more local area networks (LAN) 682 and one or more wide area networks (WAN) 683, but may also include other networks. Such networking environments are commonplace in offices, enterprise-wide computer networks, intranets and the Internet.

When used in a LAN networking environment, the computer 610 is coupled to the LAN 682 through a network interface or adapter 684. When used in a WAN networking environment, the computer 610 may include a modem 685 or other means for establishing communications over the WAN 683, such as the Internet. The modem 685, which may be internal or external, may be connected to the system bus 630 via the user input interface 665 or other appropriate mechanism. A wireless networking component including an interface and antenna may be coupled through a device, such as an access point or peer computer to a LAN 682 or WAN 683. In a networked environment, program modules depicted relative to the computer 610, or portions thereof, may be stored in the remote memory storage device. By way of example, and not limitation, FIG. 6 illustrates remote application programs 686 as residing on memory storage device 681. It may be appreciated that the network connections shown are examples and other means of establishing a communications link between the computers may be used.

The block diagram of FIG. 6 is merely illustrative of an example system that may be used in connection with one or more examples of the disclosure and is not intended to be limiting in any way. Further, peripherals or components of the computing devices known in the art are not shown, but are operable with aspects of the disclosure. At least a portion of the functionality of the various elements in FIG. 6 may be performed by other elements in FIG. 6, or an entity (e.g., processor, web service, server, applications, computing device, etc.) not shown in FIG. 6.

Figure 7:
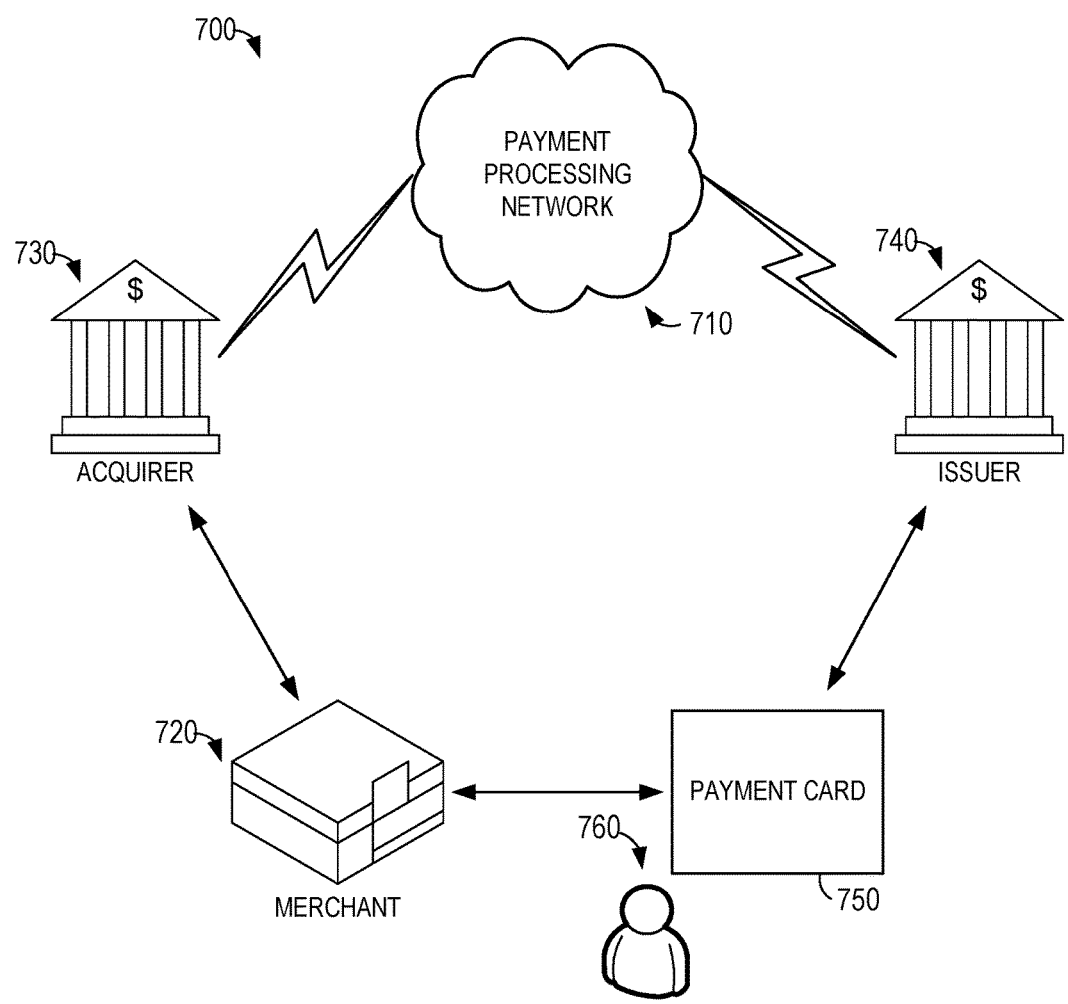
FIG. 7 is a block diagram illustrating an example environment for processing one or more financial transactions.

FIG. 7 is a block diagram illustrating an example environment 700 that may be used to process one or more financial transactions. The cardholder system 180 (shown in FIG. 1), for example, may process one or more financial transactions in the environment 700. The environment 700 includes a processing network 710, such as the MASTERCARD® brand payment processing network (MASTERCARD® is a registered trademark of MasterCard International Incorporated located in Purchase, N.Y.). The MASTERCARD® brand payment processing network is a propriety network for exchanging financial transaction data between members of the MASTERCARD® brand payment processing network.

The environment 700 includes one or more merchants 720 that accept payment via the processing network 710. For example, payment may be accepted at a client device 140. To accept payment via the processing network 710, the merchant 720 establishes a financial account with an acquirer 730 that is a member of the processing network 710. The acquirer 730 is a financial institution that maintains a relationship with one or more merchants 720 to enable the merchants 720 to accept payment via the processing network 710. The acquirer 730 may also be known as an acquiring bank, a processing bank, or a merchant bank.

The environment 700 includes one or more issuers 740 that issue or provide payment cards 750 (e.g., credit card, debit card, prepaid card, and the like) or other payment products to one or more cardholders 760 (e.g., user 130) or, more broadly, account holders ("cardholder" and "account holder" may be used interchangeably herein). The issuer 740 is a financial institution that maintains a relationship with one or more cardholders 760 to enable the cardholders 760 to make a payment using the payment card 750 via the processing network 710.

A cardholder 760 uses a payment product, such as a payment card 750, to purchase a good or service (e.g., document 112) from a merchant 720. In some embodiments, the payment card 750 is linked or associated with electronic wallet technology or contactless payment technology, such as a radio frequency identification (RFID)-enabled device, a BLUETOOTH® brand wireless technology-enabled device, a ZIGBEE® brand communication-enabled device, a WI-FI® brand local area wireless computing network-enabled device, a near field communication (NFC) wireless communication-enabled device, and/or any other device that enables the payment card 750 to purchase a good or service from a merchant 720. (BLUETOOTH® is a registered trademark of Bluetooth Special Interest Group, ZIGBEE® is a registered trademark of the ZigBee Alliance, and WI-FI® is a registered trademark of the Wi-Fi Alliance). The cardholder 760 may use any payment product that is linked or associated with a corresponding financial account maintained by an issuer 740. As described herein, the term "payment card" includes credit cards, debit cards, prepaid cards, digital cards, smart cards, and any other payment product that is linked or associated with a corresponding financial account maintained by an issuer 740. Payment cards 750 may have any shape, size, or configuration that enables the environment 700 to function as described herein.

A cardholder 760 may present the merchant 720 with a payment card 750 to make a payment to the merchant 720 in exchange for a good or service. Alternatively, the cardholder 760 may provide the merchant 720 with account information associated with the payment card 750 without physically presenting the payment card 750 (e.g., for remote financial transactions including e-commerce transactions, card-not-present transactions, or card-on-file transactions). Account information may include a name of the cardholder 760, an account number, an expiration date, and/or a security code (such as a card verification value (CVV), a card verification code (CVC), and the like).

The merchant 720 requests authorization from an acquirer 730 for at least the amount of the purchase. The merchant 720 may request authorization using any financial transaction computing device configured to transmit account information of the cardholder 760 to one or more financial transaction processing computing devices of the acquirer 730. For example, the merchant 720 may request authorization through a point-of-sale (POS) terminal, which reads account information of the cardholder 760 from a microchip or magnetic stripe on the payment card 750, and transmits the cardholder's account information to the one or more financial transaction processing computing devices of the acquirer 730. For another example, the POS terminal reads account information of the cardholder 760 from a device configured to communicate with the POS terminal using contactless payment technology, and transmits the cardholder's account information to one or more financial transaction processing computing devices of the acquirer 730.

Using the processing network 710, the financial transaction processing computing devices of the acquirer 730 communicate with one or more financial transaction processing computing devices of an issuer 740 to determine whether the account information of the cardholder 760 matches or corresponds to the account information of the issuer 740, whether the account is in good standing, and/or whether the purchase is covered by (e.g., less than) a credit line or account balance associated with the financial account. Based on these determinations, the financial transaction processing computing devices of the issuer 740 determine whether to approve or decline the request for authorization from the merchant 720.

If the request for authorization is declined, the merchant 720 is notified as such, and may request authorization from the acquirer 730 for a lesser amount or request an alternative form of payment from the cardholder 760. If the request for authorization is approved, an authorization code is issued to the merchant 720, and the cardholder's available credit line or account balance is decreased. The financial transaction is then settled between the merchant 720, the acquirer 730, the issuer 740, and/or the cardholder 760. Settlement typically includes the acquirer 730 reimbursing the merchant 720 for selling the good or service, and the issuer 740 reimbursing the acquirer 730 for reimbursing the merchant 720. When a credit card is used, the issuer 740 may bill the cardholder 760 to settle a financial account associated with the cardholder 760. When a debit or prepaid card is used, the issuer 740 may automatically withdraw funds from the account.

Although described in connection with an example computing system environment, embodiments of the disclosure are capable of implementation with numerous other general purpose or special purpose computing system environments, configurations, or devices. Embodiments of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, earphones, and the like), network PCs, minicomputers, mainframe computers, distributed computing environments that include any of the above systems or devices, and the like. Such systems or devices may accept input from the cardholder in any way, including from input devices such as a keyboard or pointing device, via gesture input, proximity input (such as by hovering), and/or via voice input.

Embodiments of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other embodiments of the disclosure may include different computer-executable instructions or components having more or less functionality than illustrated and described herein.

The embodiments illustrated and described herein as well as embodiments not specifically described herein but within the scope of aspects of the disclosure constitute example means for processing one or more transactions. For example, the elements illustrated in FIGS. 1, 2, and 4-7, such as when encoded to perform the operations illustrated in FIGS. 3-5, constitute at least an example means for receiving a request for authentication for an article associated with a first user (e.g., interface component 210); an example means for identifying one or more client devices associated with one or more secondary users (e.g., authentication component 230); an example means for communicating with the client devices to obtain biometric data associated with the secondary users (e.g., authentication component 230); an examples means for determining whether to approve the request for authentication (e.g., token component 240); and/or an example means for generating an authentication token for generating an authenticated article (e.g., token component 240).

The order of execution or performance of the operations in embodiments of the disclosure illustrated and described herein is not essential, unless otherwise specified. That is, the operations may be performed in any order, unless otherwise specified, and embodiments of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the embodiments thereof, the articles "a," "an," "the," and "said" are intended to mean that there are one or more of the elements. Furthermore, references to an "embodiment" or "example" of the present disclosure are not intended to be interpreted as excluding the existence of additional embodiments or examples that also incorporate the recited features. The terms "comprising," "including," and "having" are intended to be inclusive and mean that there may be additional elements other than the listed elements. The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

In some embodiments, the operations illustrated in the drawings may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

While the aspects of the disclosure have been described in terms of various embodiments with their associated operations, a person skilled in the art would appreciate that a combination of operations from any number of different embodiments is also within scope of the aspects of the disclosure.

What is claimed is:

1. A computing device for processing one or more transactions, the computing device comprising:
   a memory device storing data associated with one or more user accounts, and computer-executable instructions; and
   a processor configured to execute the computer-executable instructions to:
      receive a request for authentication of a n article provided by a first user for the authentication of the article, the first user associated with a user account;
      identify one or more client devices associated with one or more second users, the one or more second users associated with the user account;
      based on a request for biometric data associated with the one or more second users sent to the one or more client devices, receive the biometric data from the one or more client devices;
      receive, from a biometric system, user identifier data associated with the one or more second users based on a request, transmitted to the biometric system, for information including the received biometric data;
      receive user identifier data associated with the first user and compare with registered identifier data associated with the user account;
      based on the comparison and on the received user identifier data associated with the one or more second users, determine whether to approve the request for authentication of the article provided by the first user; and
      on condition that the request for authentication is a pproved, generate an authentication token for generating an authenticated article associated with the first user.

2. The computing device of claim 1, wherein the one or more second users are public notaries.

3. The computing device of claim 1, wherein the processor is further configured to execute the computer-executable instructions to:
receive a request for registration including biometric data associated with the first user; and
register the biometric data associated with the first user with the user account.

4. The computing device of claim 1, wherein the processor is further configured to execute the computer-executable instructions to:
receive biometric data associated with the first user;
transmit, to the biometric system, a request for information including the biometric data associated with the first user; and
receive, from the biometric system, a response to the request for information including user identifier data, wherein it is determined whether to approve the request for authentication based on the user identifier data.

5. The computing device of claim 1, wherein the processor is further configured to execute the computer-executable instructions to:
receive a request for registration including the biometric data associated with the one or more second users; and
register the biometric data associated with the one or more second users with the user account.

6. The computing device of claim 5, wherein the processor is further configured to execute the computer-executable instructions to compare the biometric data associated with the one or more second users with the registered biometric data associated with the user account, wherein it is determined whether to approve the request for authentication based on the comparison of the biometric data associated with the one or more second users with the registered biometric data associated with the user account.

7. The computing device of claim 1, wherein the processor is further configured to execute the computer-executable instructions to:
couple the authentication token to the article to generate the authenticated article; and
transmit, to a client device associated with the first user, the authenticated article.

8. A computer-implemented method for processing one or more transactions, the computer-implemented method comprising:
receiving a request for authorization for an article associated with a first user, the first user associated with a user account;
accessing the user account to identify one or more client devices associated with one or more second users, the one or more second users associated with the user account;
based on a request for biometric data associated with the one or more second users sent to the one or more client devices, receiving the biometric data from the one or more client devices;
receiving, from a biometric system, user identifier data associated with the one or more second users based on a request, transmitted to the biometric system, for information including the received biometric data;
receiving user identifier data associated with the first user and comparing with registered identifier data associated with the user account;
based on the comparison and on the received user identifier data associated with the one or more second users, determining whether to approve the request for authentication for the article associated with the first user; and
on condition that the request for authentication is approved, generating a token for generating an authenticated article associated with the first user.

9. The computer-implemented method of claim 8, wherein determining whether to approve the request for authentication comprises receiving biometric data associated with the first user, wherein it is determined whether to approve the request for authentication based on the biometric data associated with the first user.

10. The computer-implemented method of claim 8, further comprising:
receiving a request for registration including biometric data associated with the first user; and
registering the biometric data associated with the first user with the user account.

11. The computer-implemented method of claim 8, wherein determining whether to approve the request for authentication comprises:
receiving biometric data associated with the first user;
transmitting, to the biometric system, a request for information including the biometric data associated with the first user; and
receiving, from the biometric system, a response to the request for information including user identifier data, wherein it is determined whether to approve the request for authentication based on the user identifier data.

12. The computer-implemented method of claim 8, wherein determining whether to approve the request for authentication comprises:
receiving biometric data associated with the first user; and
comparing the biometric data associated with the first user with registered biometric data associated with the user account, wherein it is determined whether to approve the request for authentication based on the comparison of the biometric data associated with the first user with the registered biometric data associated with the user account.

13. The computer-implemented method of claim 8, further comprising:
receiving, from the one or more client devices, a request for registration for the biometric data associated with the one or more second users; and
registering the biometric data associated with the one or more second users with the user account.

14. The computer-implemented method of claim 13, wherein determining whether to approve the request for authentication comprises comparing the biometric data associated with the one or more second users with the biometric data registered with the user account, wherein it is determined whether to approve the request for authentication based on the comparison of the biometric data associated with the one or more second users with the biometric data registered with the user account.

15. The computer-implemented method of claim 8, further comprising:
coupling the token to the article to generate the authenticated article; and
transmitting, to a first client device, the authenticated article.

16. A computer-readable storage device having computer-executable instructions embodied thereon, the computer-readable storage device comprising:
an interface component that, upon execution by at least one processor, causes a computing device to receive a request for authorization for an article provided by a first user for the authorization of the article, the first user associated with a user account;

an authentication component that, upon execution by the at least one processor, causes the computing device to identify one or more second users associated with the user account, and based on a request for biometric data associated with the one or more second users sent to one or more client devices, receive biometric data associated with the one or more second users;

the authentication component, upon execution by the at least one processor, further causes the computing device to receive, from a biometric system, user identifier data associated with the one or more second users based on a request, transmitted to the biometric system, for information including the received biometric data;

the authentication component, upon execution by the at least one processor, further causes the computing device to receive user identifier data associated with the first user and compare with registered identifier data associated with the user account;

a token component that, upon execution by the at least one processor, causes the computing device to determine, based on the comparison and on the received user identifier data associated with the one or more second users, whether to approve the request for authorization for the article associated with the first user; and on condition that the request for authorization is approved, generate an authorization token associated with the first user.

17. The computing device of claim 1, wherein the user identifier data associated with the first user is obtained by:

receiving, from a first client device, biometric data associated with the first user;

transmitting, to a biometric system, a request for information including the biometric data associated with the first user; and receiving, from the biometric system, a response to the request for information that includes user identifier data.

18. The computing device of claim 1, wherein determining whether to approve the request for authentication comprises:

receiving, from a first client device, biometric data associated with the first user; and comparing the biometric data associated with the first user with registered biometric data associated with the user account, wherein it is determined whether to approve the request for authentication based on the comparison of the biometric data associated with the first user with the registered biometric data associated with the user account.

19. The computer-readable storage device of claim 16, wherein determining whether to approve the request for authentication comprises:

receiving biometric data associated with the first user; and comparing the biometric data associated with the first user with registered biometric data associated with the user account, wherein it is determined whether to approve the request for authentication based on the comparison of the biometric data associated with the first user with the registered biometric data associated with the user account.

20. The computer-readable storage device of claim 16, wherein the user identifier data associated with the first user is obtained by:

receiving biometric data associated with the first user;

transmitting, to a biometric system, a request for information including the biometric data associated with the first user; and receiving, from the biometric system, a response to the request for information that includes user identifier data.

* * * * *